United States Patent [19]

Deeks

[11] 4,057,155
[45] Nov. 8, 1977

[54] RAILROAD CAR

[75] Inventor: Ronald George Deeks, Oakville, Canada

[73] Assignee: Procor Limited, Oakville, Canada

[21] Appl. No.: 738,520

[22] Filed: Nov. 4, 1976

[51] Int. Cl.² ............................................... B60P 1/60
[52] U.S. Cl. .................................. 214/83.28; 222/195; 302/53
[58] Field of Search ................. 214/83.28; 302/52, 53; 222/195; 259/DIG. 17

[56] References Cited

U.S. PATENT DOCUMENTS 3,929,261  12/1975  Solimar .............................. 302/53 X Primary Examiner—Robert G. Sheridan
Attorney, Agent, or Firm—Joel E. Siegel; Charles M. Kaplan

[57] ABSTRACT

An enclosed container for transporting a powdered material is aerated by a pressurized gas which is forced between a long sheet of flexible, gas-impervious material and a sloping surface of the container. The sheet material is held in place by a pair of clamps which accurately control the size of the space through which the gas flows so as to cause the sheet material to vibrate or flutter over a relatively long distance.

13 Claims, 8 Drawing Figures

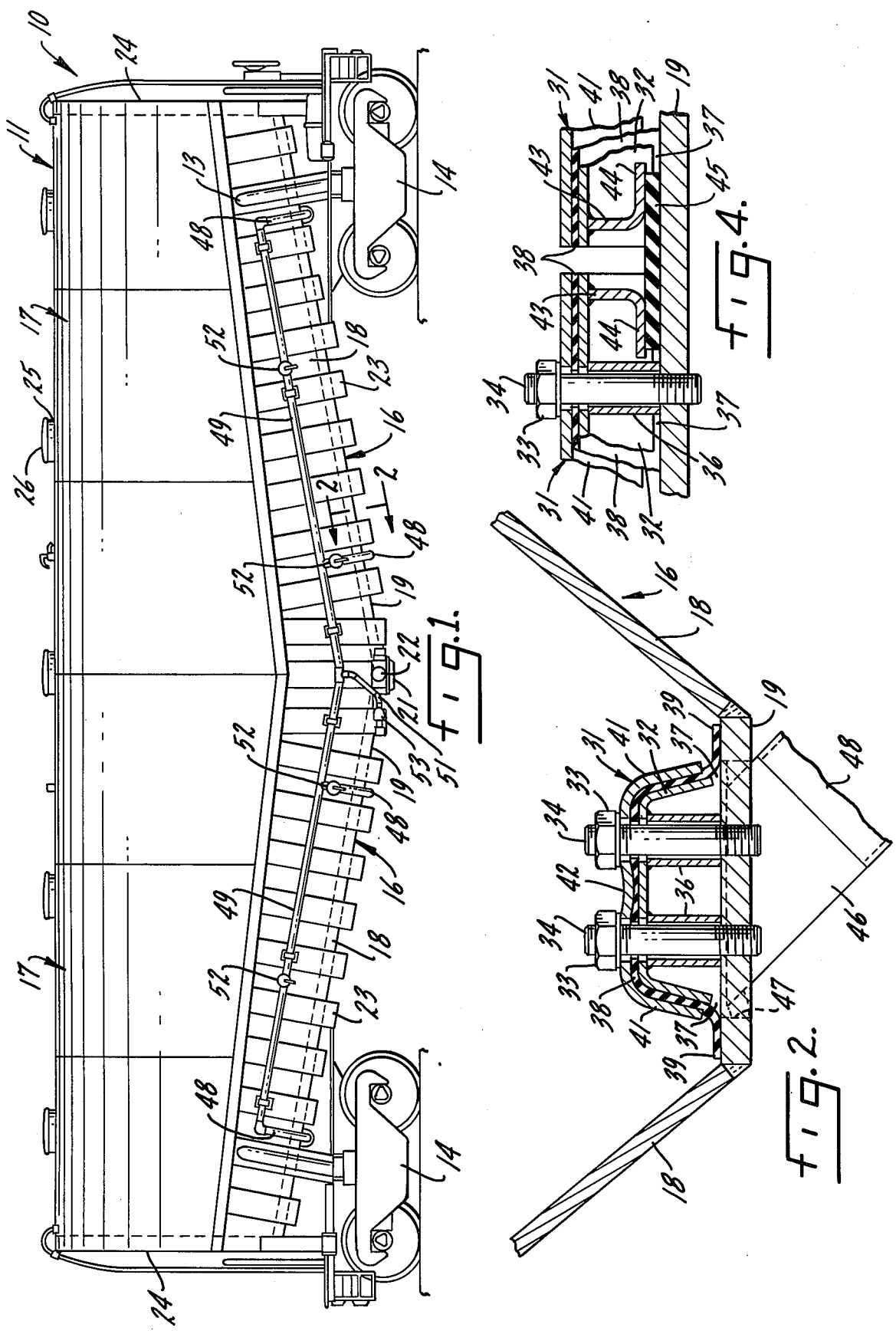

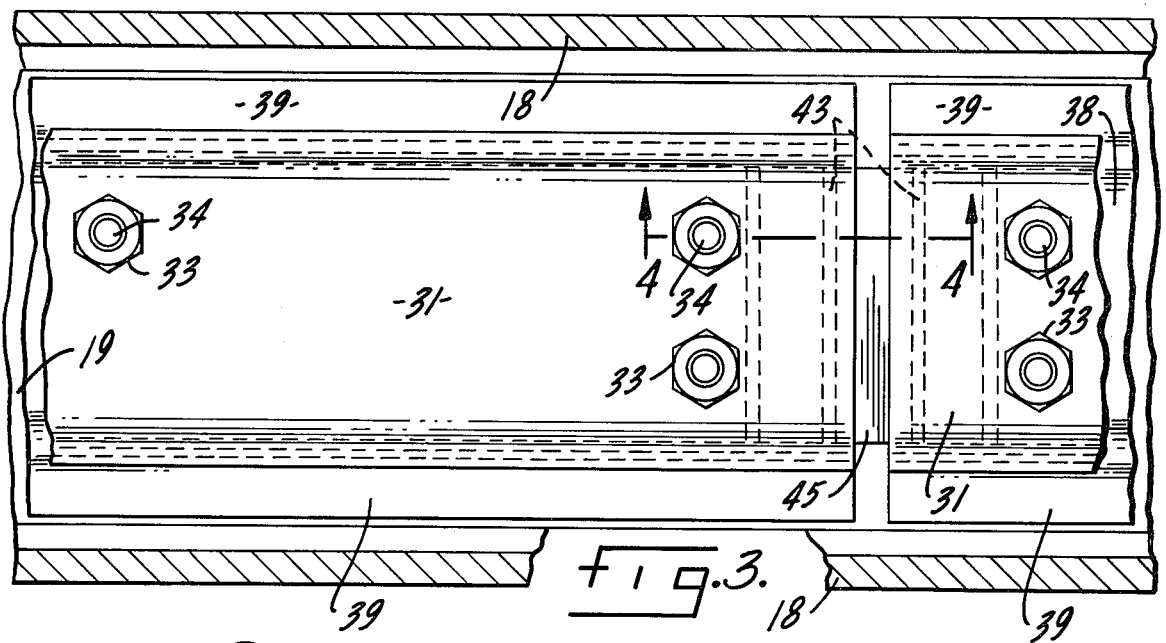
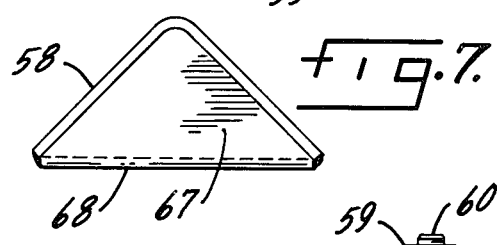
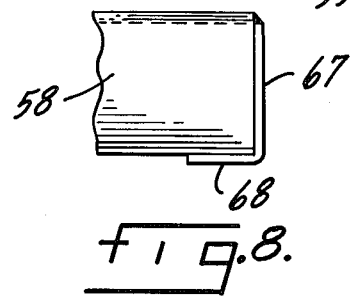
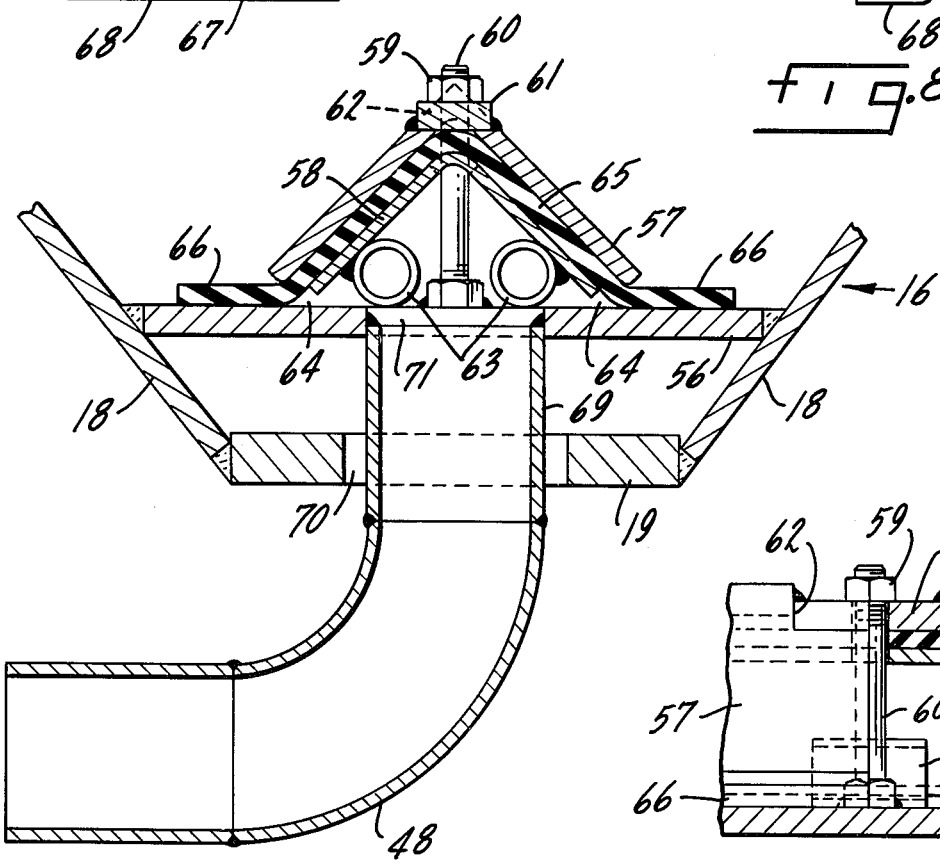
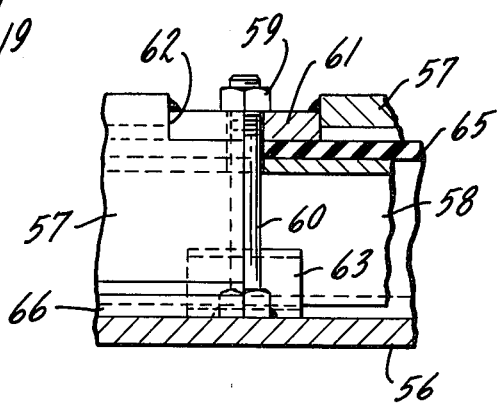

RAILROAD CAR

BACKGROUND OF THE INVENTION

Containers for storing or transporting powdered or granular commodities frequently employ pneumatic conveyors to facilitate movement and discharge of the commodity. Gas pervious membranes, such as canvas or other fabrics, are commonly used to diffuse and direct the flow of fluidizing gas into the commodity. However, such membranes require complicated and costly mechanical devices to hold them in place, and they can not be cleaned simply by hosing down with water. Also, they are frequently clogged by powdered commodities or the fines of granular materials. This sometimes prevents their use in railroad vehicles. Prior art pneumatic conveyors using gas impervious membranes possess serious deficiencies when fluidizing gas flow has to be accurately controlled for long distances, or has to be readily changeable for different commodities or conditions.

SUMMARY OF THE INVENTION

Accordingly, it is an object of the invention to provide an improved arrangement for conveying and discharging a powdered or granular material.

Another object is to provide a container with a pneumatic discharge device that is not clogged by powdered material.

Another object is to provide a pneumatic conveyor with a gas flow space that can be accurately controlled for long distances and which can be easily changed when required.

Another object is to provide a transportable container for powdered or granular material with a pneumatic discharge arrangement that is inexpensive to clean and maintain.

Another object is to provide a pneumatic conveyor and discharge system that is usable over a wide range of temperatures, pressures, product densities and particle sizes.

Another object is to provide an enclosed railroad vehicle for powdered or granular commodities with a fluidized discharge system which is relatively inexpensive, durable, easily changed for different commodities, and which does not possess defects found in similar prior art systems.

Other objects and advantages of the invention will be found in the specifications and claims and the scope of the invention will be pointed out in the claims.

DESCRIPTION OF THE DRAWING

FIG. 1 is an elevational view of a railroad tank car constructed in accord with the invention.

FIG. 2 is an enlarged cross sectional view taken along the line 2—2 in FIG. 1.

FIG. 3 is a partially broken away bottom view of the invention.

FIG. 4 is a cross sectional view taken along the line 4—4 in FIG. 3.

FIG. 5 is a cross sectional view, corresponding to FIG. 2, of another embodiment of the invention.

FIG. 6 is a partially broken away side view of the embodiment of FIG. 5.

FIG. 7 is an end view of the inner clamping member of the embodiment of FIG. 5.

FIG. 8 is a side view of the end of the clamping member shown in FIG. 7.

DESCRIPTION OF THE INVENTION

This invention may be used as a pneumatic conveyor, or to promote fluidized discharge from a stationary storage container, but the invention is especially useful in sealed railroad tank cars for powdered materials such as cement having essentially the structure disclosed in application for U.S. Pat. Ser. No. 561,143 filed Mar. 3, 1975, now abandoned, and assigned to the same assignee as this invention. Such a tank car 10 has an elongated metal body 11 supported at its opposite ends through a bolster-shear plate-draft sill assembly 13 on wheel trucks 14 of conventional construction. Body 11 has a lower portion formed from a pair of V-shaped hopper or trough sections 16 which slope downwardly at a predetermined angle (e.g., 10°) from each end of the car to meet at the center of the car. A pair of assymetric truncated cone sections 17 are secured to the upper edges of hopper sections 16 so as to form the upper portions of the car.

Hopper sections 16 are formed from side wall plates 18 extending downwardly toward each other at a predetermined angle (e.g., 60°). The lower edges of plates 18 are secured to each other by flat bottom closure plates 19 which meet and terminate adjacent a bottom outlet opening 21 at the center and lowermost location of car 10. A conventional valve assembly 22 controls discharge flow through opening 21. Side stiffener channels 23 may be secured at intervals along plates 18. End sheets 24 close off the ends of body 11. Car 10 should include other necessary conventional accessories such as top inlet openings 25 with hatch covers 26, couplers, etc., and a complete description of the car may be obtained from the aforementioned application for U.S. Pat. Ser. No. 561,143.

Car 10 is equipped with a system for discharging and conveying a powdered or granular commodity by fluidizing in accord with the teachings of this invention, the preferred embodiment being shown in FIGS. 1–4. Pairs of separate, correspondingly U-shaped clamping members 31 and 32 lie in the bottom of the hopper troughs defined by sloping side wall plates 18. Lower member 32 is nested within upper member 31, and each pair of clamping members extends for a substantial distance (e.g., 14 feet) along a bottom plate 19. Members 31 and 32 are removably attached to plate 19 by nuts 33 threaded on to studs 34 which may be threaded into tapped holes in plate 19. The lower terminal edges of members 31 and 32 are spaced a slight distance above plates 19 by sleeves 36 which receive studs 34. Studs 34 and their telescoped sleeves 36 are spaced in pairs or staggered at intervals along plates 19 so as to accurately define a pair of long gas gaps 37 of predetermined size (e.g. one-eighth inch) on opposite sides of the clamping members. Sleeves 36 may be welded to member 32 as shown or may be unattached to facilitate changing the size of gaps 37 replacement with sleeves of different length. A continuous sheet 38 of thin, flexible, gas-impervious material (e.g., natural rubber one-fourth inch thick) is securely clamped and immobilized between each pair of clamping members 31 and 32. Perforations in sheets 38 permit studs 34 to pass therethrough. Edge portions 39 of each sheet 38 protrude beyond each side of members 31 and 32 into contact with bottom plate 19 so as to seal the entire length of both gaps 37, and thus prevent the commodity in car 10 from escaping into the enclosed space under members 31 and 32. The legs 41 of upper clamping member 31 diverge downwardly at a slightly smaller angle than the corresponding legs of member 32 in order to ensure pressure on sheet 38 that will keep seal portions 39 tight against plate 19. The central portion 42 of member 31 is curved slightly downwardly toward member 32 to ensure sealing around studs 34 by squeezing sheet 38 therebetween. As shown in FIG. 4, adjacent pairs of clamping members 31 and 32 may be spaced slightly from each other. An end closure piece 43 spans the inside of each inner member 32 at each end and seals off the end of such member 32. An inwardly directed ledge 44 on each closure piece 43 rests on a rubber spacer 45 so as to complete the end seal and to help maintain the accuracy of gaps 37 at the ends of members 31 and 32.

A pressurized gas (e.g., air at from about 5 to 30 p.s.i.) is forced into the sealed space beneath each member 32 through a plurality of spaced gas inlet conduits 46 which extend into holes 47 through plates 19. Each conduit 46 is connected to a lateral pipe 48 which branches off a gas distribution header 49 which is connected to a pressurized gas inlet pipe 51. Control and check valves 52 regulate the flow into each lateral pipe 48, and a master control valve 53 regulates the flow from a suitable source of pressurized gas.

Another embodiment of the invention shown in FIGS. 5-8 is identical to the embodiment of FIGS. 1-4, except as noted herein. A flat plate 56 is attached to side wall plates 18 above bottom plate 19. This permits the discharge angle of the material conveying surface at the bottom of the car to be different (e.g., 8°-12°) from the angle of bottom plates 19. Pairs of separate correspondingly V-shaped clamping members 57 and 58 lie in the bottom of the hopper troughs defined by plates 18. Lower member 58 is nested within upper member 57. Members 57 and 58 are removably attached to plate 56 by nuts 59 threaded on studs 60 which are attached to plate 56. Each nut 59 bears against a circular washer 61 which is received in notch 62 in upper member 57. A plurality of round spacer lugs 63 attached at intervals to the under side of member 58 raise the lower terminal edges of members 57 and 58 slightly above plate 56 so as to define a pair of long gas gaps 64. A sheet 65 of gas-impervious material having sealing edge portions 66 is tightly clamped between members 57 and 58 so as to seal gaps 64, as previously described with reference to the embodiment of FIGS. 1-4. A closure piece 67 seals off both ends of each member 58, and an inwardly directed ledge 68 on each piece 67 seals and maintains proper air gap spacing as previously described. Pressurized gas is fed into the sealed spaces under members 58 through a plurality of spaced conduits 69 connected to laterals 48 and passing through holes 70 in plates 19 into openings 71 in plates 56.

Tank car 10 may be unloaded in known manner by connecting one or more hose couplings to discharge outlet 21 and connecting a supply of pressurized gas to opened inlet pipe 51. When a predetermined gas pressure is attained in body 11, control valve 22 is opened and the fluidized commodity is pumped under pressure through outlet 21 to a designated receiver, which may be at a higher elevation than car 10. Gravity discharge from car 10 may be achieved simply by opening valve 22 and one or more hatch covers 26. Then sufficient pressurized gas is pumped through inlet 51 to keep the commodity flowing through outlet 21. The gas flow to various areas of car 10 is controlled by valves 52. Sealing edge portions 39 and 66 flutter and vibrate along their entire length thus creating turbulence which promotes fluidized flow and thus breaking up any material clogs or bridges.

It has thus been shown that by the practice of this invention a railroad car can be provided with a durable, easily cleaned and easily changeable gas discharge system. The inside of car 10 can be cleaned simply by hosing with steam, water or a cleaning solution, or the clamping members 31 and 32 or 57 and 58 and the vibrating sheets 38 or 65 can be removed by detaching nuts 33 or 59 and removing the entire assembly through the top hatches 25 when more thorough cleaning or maintenance is necessary. Any material which has caked on sealing edge portions 39 or 66 can be flaked off by blowing air through the system so as to vigorously vibrate the sheets. Gas gaps 37 and 64 can be changed easily for products of different density, moisture content, or flow characteristics, or for use of car 10 with different commodity receiving systems, simply by replacing sleeves 36 with other sleeves 36 of different lengths, or by replacing specific clamping members 58 with other members 58 having lugs 64 of a different diameter; rubber spacers 46 should be replaced if necessary with other spacers 46 of different thickness.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A container for powdered material having a surface sloping toward a bottom outlet opening, and means for aerating said material to cause discharge through said outlet opening, comprising: a pair of separate, correspondingly shaped, clamping members, one of which is nested within the other; means spacing the lower terminal edges on opposing sides of each of said clamping members slightly above said sloping surface so as to define a pair of spaced gas gaps between said terminal edges of each clamping member and said sloping surface on opposite sides of said clamping members; flexible, gas-impervious sheet material clamped between said clamping members and having a pair of spaced portions extending beyond said terminal edges into contact with said sloping surface on opposite sides of said clamping members that each portion of sheet material seals one of said spaced gas gaps; means for attaching said clamping members to said container and causing said clamping members to immobilize said sheet material except for said pair of portions extending beyond said terminal edges and sealing said spaced gas gaps; and means for forcing pressurized gas between said clamping members and said sloping surface so as to cause said spaced portions of said sheet material to flutter as said gas escapes therebetween through said spaced gas gaps into said powdered material.

2. The invention defined in claim 1, wherein said means for attaching said clamping members to said container comprises a plurality of upstanding spaced studs attached to said container having threaded terminal ends passing through said clamping members, and nuts on said threaded ends tightened against one of said clamping members.

3. A container for powdered material having a surface sloping toward a bottom outlet opening, and means for aerating said material to cause discharge through said outlet opening, comprising: a pair of separate, correspondingly shaped, clamping members, one of which is nested within the other; means for attaching said clamping members to said container comprising a plurality of upstanding spaced studs attached to said container having threaded terminal ends passing through said clamping members, and nuts on said threaded ends tightened against one of said clamping members; sleeves telescoping said studs between said clamping members and said container so as to space the lower terminal edges of said clamping members slightly above said sloping surface so as to define a gas gap; flexible, gas-impervious sheet material clamped between said clamping members and having a portion extending beyond their terminal edges into contact with said sloping surface so as to seal said gas gap; said spaced studs and nuts threaded therein causing said clamping members to immobilize said sheet material except for said portion sealing said gas gap; and means for forcing pressurized gas between said clamping members and said sloping surface so as to cause said portion of said sheet material to flutter as said gas escapes therebetween into said powdered material.

4. The invention defined in claim 3, wherein said sleeves are removable from said studs and replaceable by sleeves of differing lengths so as to vary the spacing between said terminal edges and said sloping surface.

5. A container for powdered material having a surface sloping toward a bottom outlet opening, and means for aerating said material to cause discharge through said outlet opening, comprising: a pair of separate correspondingly shaped, clamping members, one of which is nested within the other; means comprising a plurality of metal lugs welded to the underside of one of said clamping members spacing the lower terminal edges of said clamping members slightly above said sloping surface so as to define a gas gap; flexible, gas-impervious sheet material clamped between said clamping members and having a portion extending beyond their terminal edges into contact with said sloping surface so as to seal said gaps; means for attaching said clamping members to said container and causing said clamping members to immobilize said sheet material except for said portion sealing said gas gap; and means for forcing pressurized gas between said clamping members and said sloping surface so as to cause said portion of said sheet material to flutter as said gas escapes therebetween into said powdered material.

6. The invention defined in claim 1, wherein each of said clamping members is shaped like an inverted V.

7. The invention defined in claim 1, wherein each of said clamping members is shaped like an inverted U.

8. The invention defined in claim 7, wherein a central portion of said other clamping member is curved toward said nested member to ensure squeezing of said sheet material therebetween.

9. The invention defined in claim 2, wherein the lower portion of said container converges into a generally V shape; said sloping surface is a flat plate which intersects said V shaped portion near its vertex; and said upstanding studs are attached to said flat plate.

10. The invention defined in claim 1, wherein said clamping members have diverging legs, and the legs of said clamping member nested within said other clamping member diverge at a greater angle than those of said other clamping member.

11. The invention defined in claim 1, wherein a terminal end of said clamping member nested within said other clamping member is closed by means spanning said end so as to prevent said gas from escaping therethrough.

12. The invention defined in claim 11, wherein an inwardly directed ledge on said end spanning means bears against a resilient spacer for sealing said end.

13. A railroad car comprising an enclosed container for transporting powdered material, said container having two sections which slant toward a common bottom outlet opening, the lower portion of each section converging into a generally V shape; flat plates intersecting said V shaped portion of each section near its vertex and said flat plates sloping toward said common bottom outlet opening; means for aerating said material to cause discharge through said outlet opening comprising: pairs of separate, relatively narrow, correspondingly shaped, clamping members one which is nested within the other, each pair of clamping members extending along a major portion of one of said flat plates and terminating adjacent said outlet opening; means spacing the lower terminal edges of each pair of clamping members slightly above the surface of its flat plate so as to define a pair of air gaps; thin flexible, gas-impervious sheet material clamped between each pair of clamping members and having portions extending beyond their terminal edges into contact with said flat plates on both sides so as to seal said air gaps; a plurality of upstanding spaced studs attached to said flat plates and having threaded terminal ends passing through said clamping members, and nuts on said threaded ends tightened against the uppermost of said clamping members for attaching said clamping members to said container and causing said clamping members to immobilize said sheet material except for said portions sealing said air gaps; and means for forcing pressurized air between said clamping members and said flat plates so as to cause said portions of said sheet material to flutter as said air escapes therebetween into said powdered material.

* * * * *

UNITED STATES PATENT AND TRADEMARK OFFICE
CERTIFICATE OF CORRECTION

PATENT NO. : 4,057,155
DATED : November 8, 1977
INVENTOR(S) : Ronald George Deeks It is certified that error appears in the above-identified patent and that said Letters Patent are hereby corrected as shown below:

In column 2, line 9 delete "now abandoned" and insert
--now U.S. Patent No. 4,044,690--.

In column 2, line 40 delete "U-shaped" and insert
--"U"-shaped--

In column 2, line 57 add --by-- after "37".

Signed and Sealed this

Twenty-first Day of March 1978

[SEAL]

Attest:

RUTH C. MASON
Attesting Officer

LUTRELLE F. PARKER
Acting Commissioner of Patents and Trademarks